Aug. 6, 1946.    S. BRAND ET AL    2,405,287
RECORD CONTROLLED ACCOUNTING MACHINE
Original Filed March 3, 1942    10 Sheets-Sheet 3
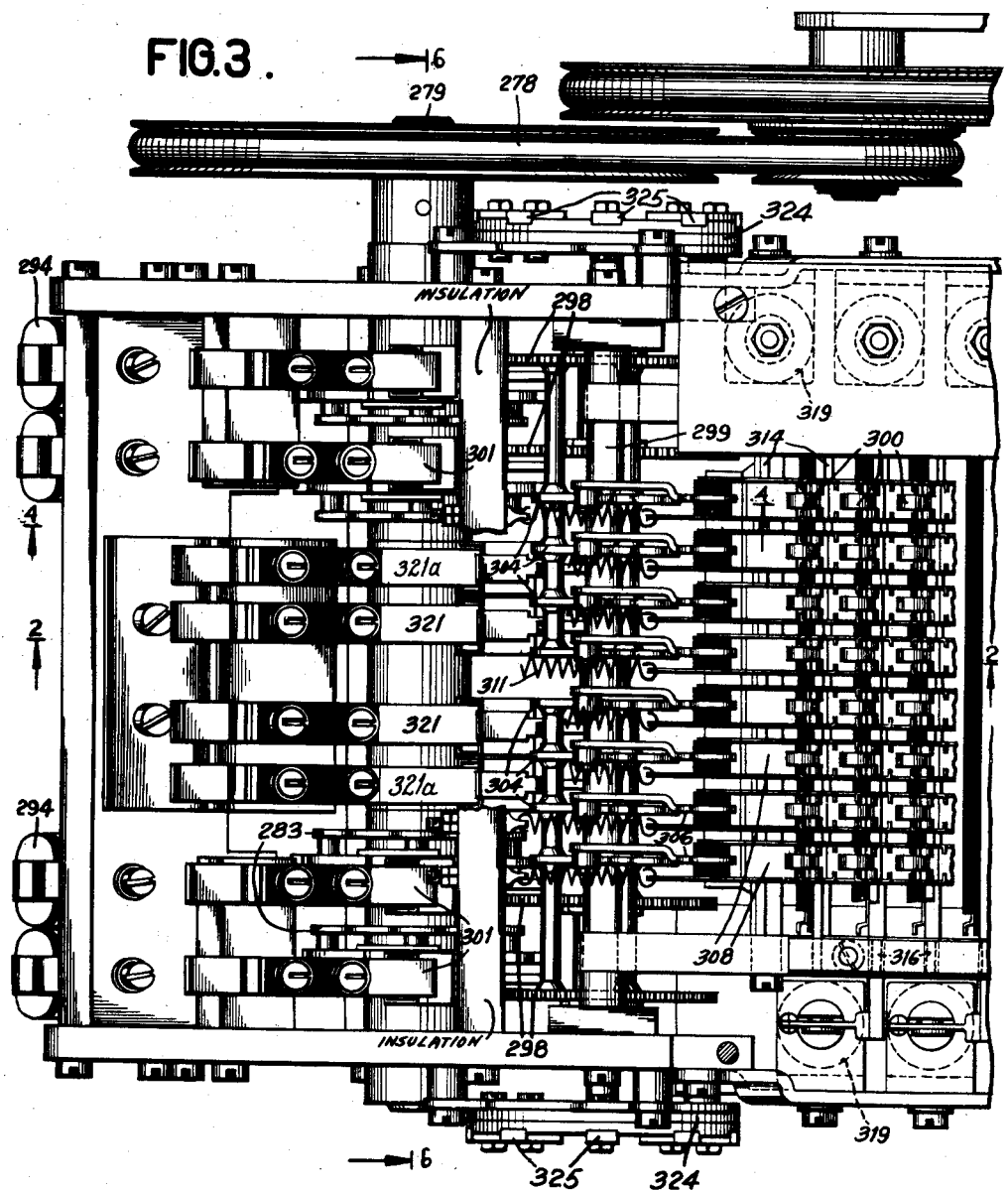

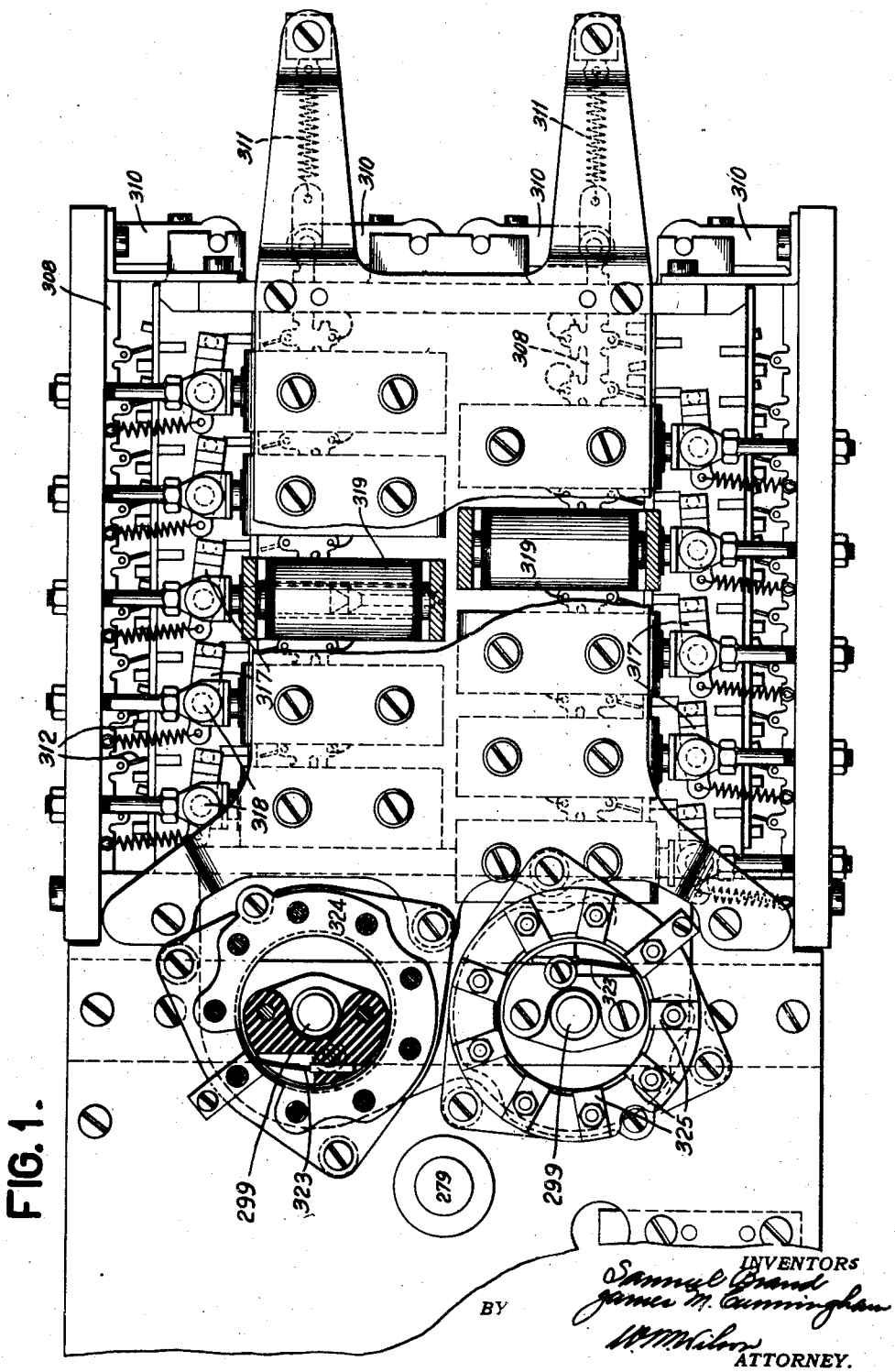

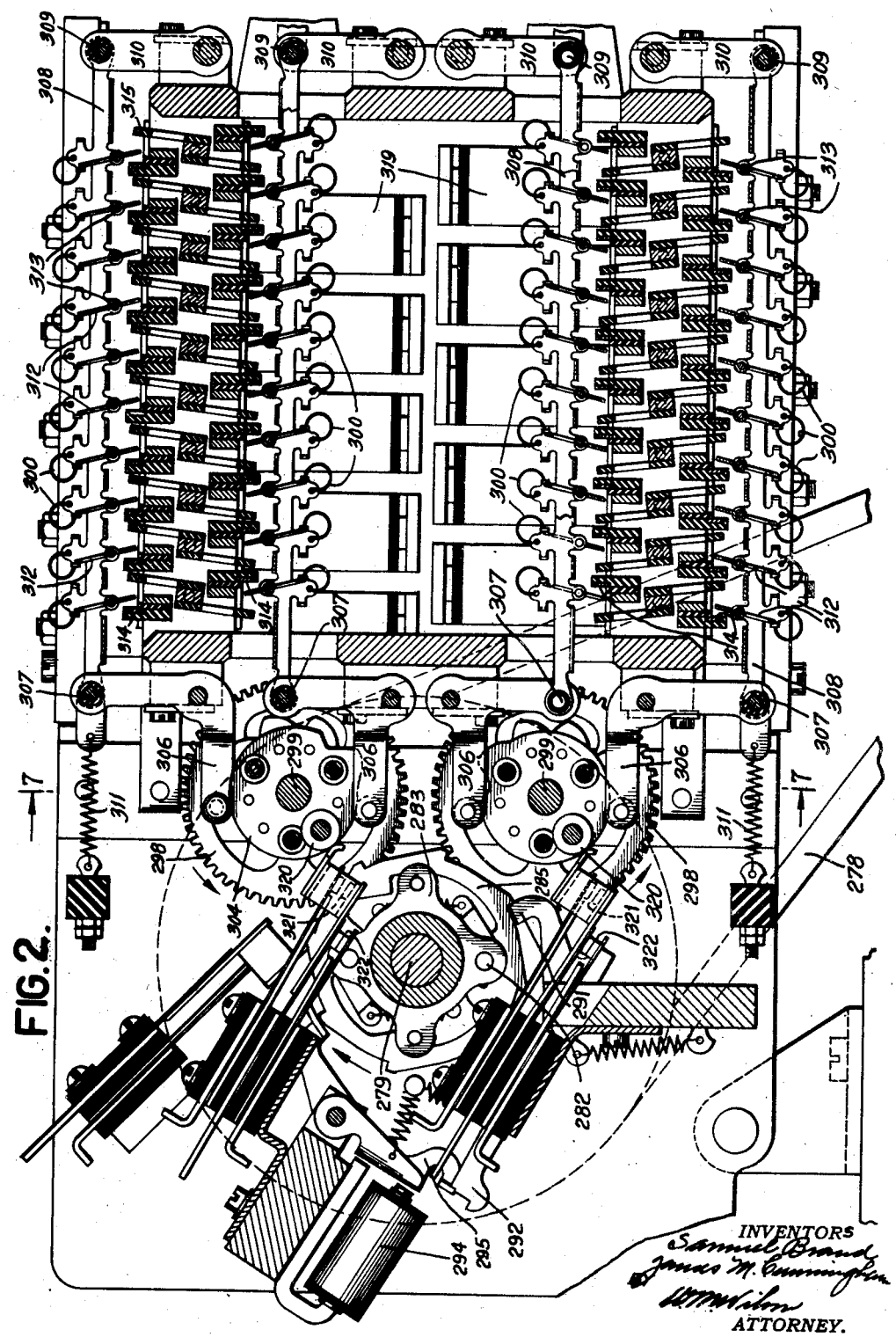

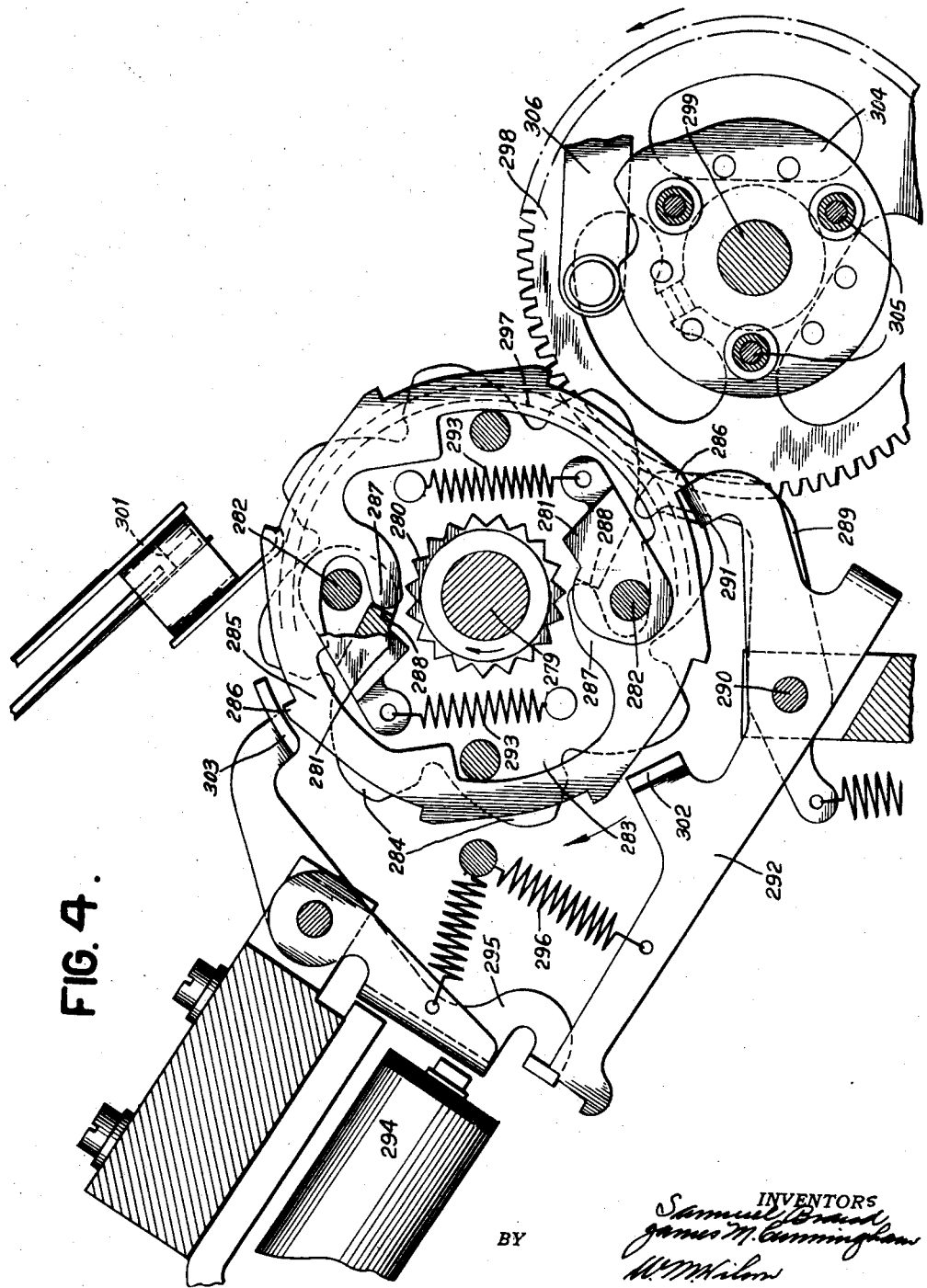

Aug. 6, 1946. S. BRAND ET AL 2,405,287
RECORD CONTROLLED ACCOUNTING MACHINE
Original Filed March 3, 1942 10 Sheets-Sheet 5

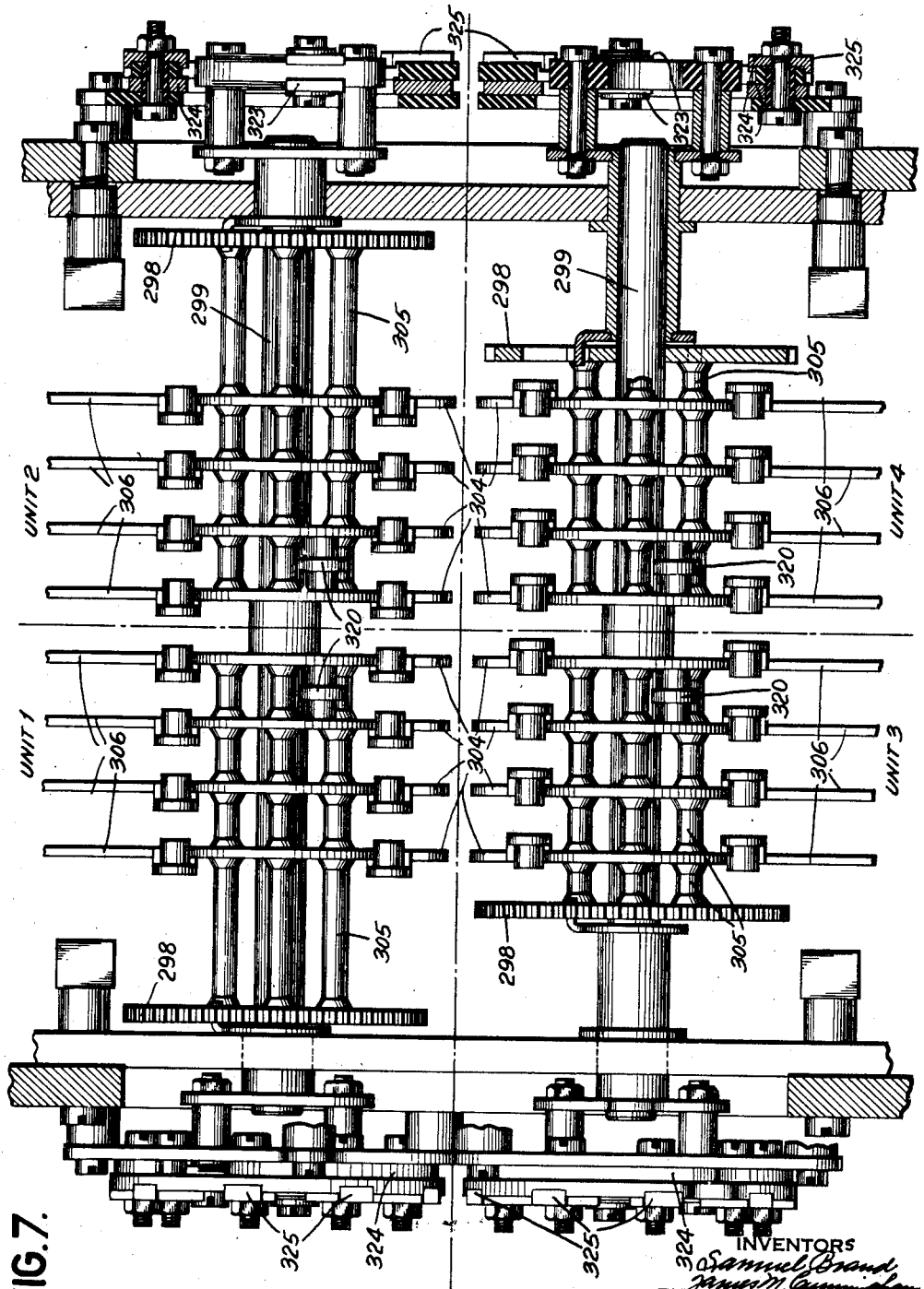

Aug. 6, 1946.                S. BRAND ET AL                2,405,287
                  RECORD CONTROLLED ACCOUNTING MACHINE
              Original Filed March 3, 1942    10 Sheets-Sheet 7

INVENTORS
Samuel Brand
James M. Cunningham
BY
W. M. Wilson
ATTORNEY

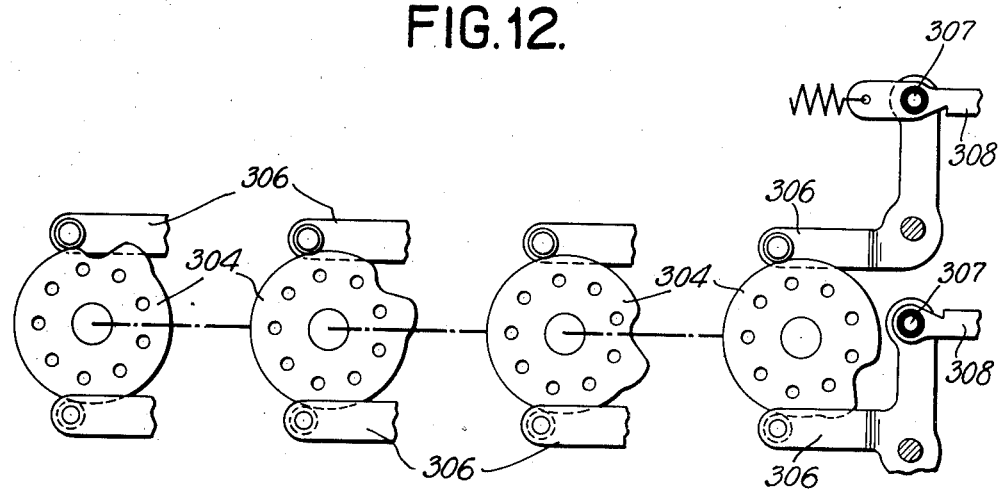

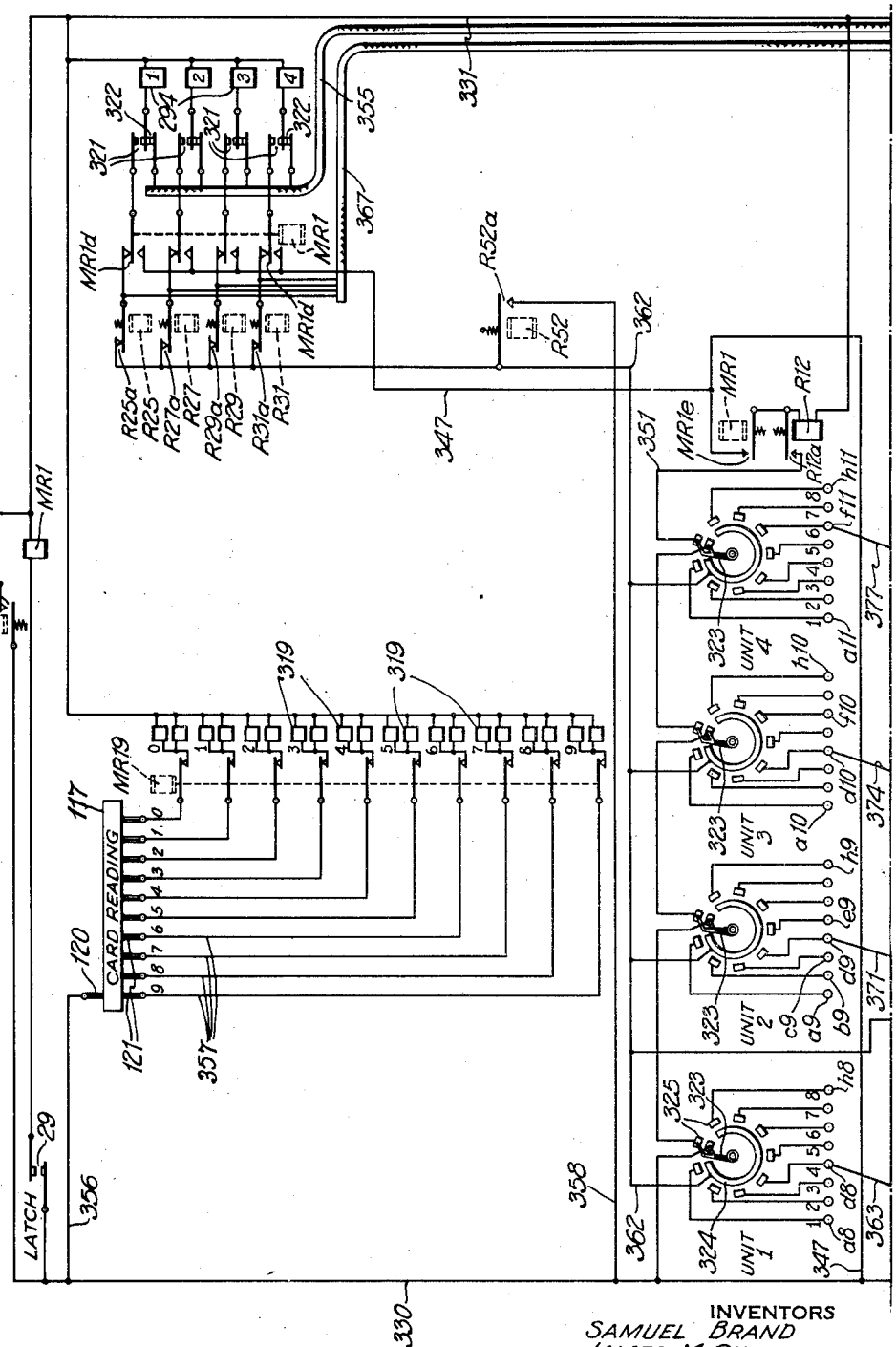

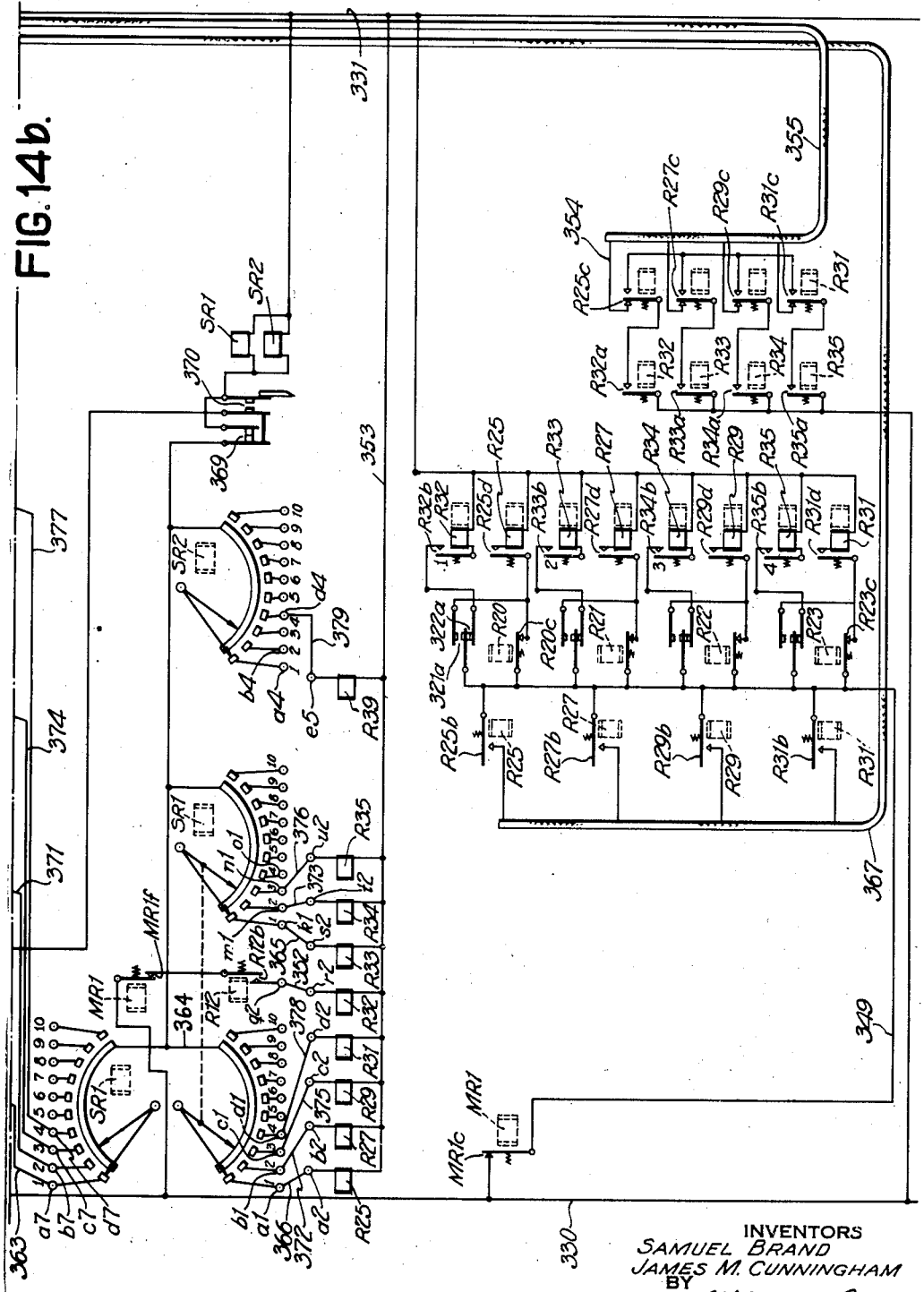

Patented Aug. 6, 1946

2,405,287

UNITED STATES PATENT OFFICE 2,405,287

RECORD CONTROLLED ACCOUNTING MACHINE

Samuel Brand, Binghamton, and James M. Cunningham, Endicott, N. Y., assignors to International Business Machines Corporation, New York, N. Y., a corporation of New York Original application March 3, 1942, Serial No. 433,178. Divided and this application January 1, 1943, Serial No. 471,052

9 Claims. (Cl. 235—61.6)

This application is a division of our copending application Serial No. 433,178, filed March 3, 1942, now Patent 2,375,275.

This invention relates to calculating machines and more particularly to machines in which perforated records control the operation of the calculating mechanism.

One of the objects of the invention is to provide an improved data storing mechanism in which data is entered from record cards as the columns thereof are sensed successively.

A further object of the invention is to provide a plurality of such storage devices and improved interconnecting and controlling mechanisms whereby the data in the sensed record card columns may selectively control any of the storage devices and in any order.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an elevation of the storage units.

Fig. 2 is a partial vertical section of Fig. 1 showing the interior construction of the storage units. The view is taken along lines 2—2 of Fig. 3.

Fig. 3 is a plan view of the storage units looking down on Figs. 1 and 2.

Fig. 4 is a detail of one of the storage unit operating clutches taken along lines 4—4 of Fig. 3.

Fig. 7 is a view showing the relative location of the four sets of storage unit operating cams, this section being taken substantially along lines 7—7 of Fig. 2.

Fig. 12 is a diagram showing the relative displacement of a set of controlling cams in the storage unit.

Fig. 13 is a fragment of a record card such as is sensed by the machine to control the operation of the storage mechanism.

Figs. 14a and 14b taken together and placed in the above order named constitute a wiring diagram of the electrical circuits.

The storage mechanisms

Figure 6:
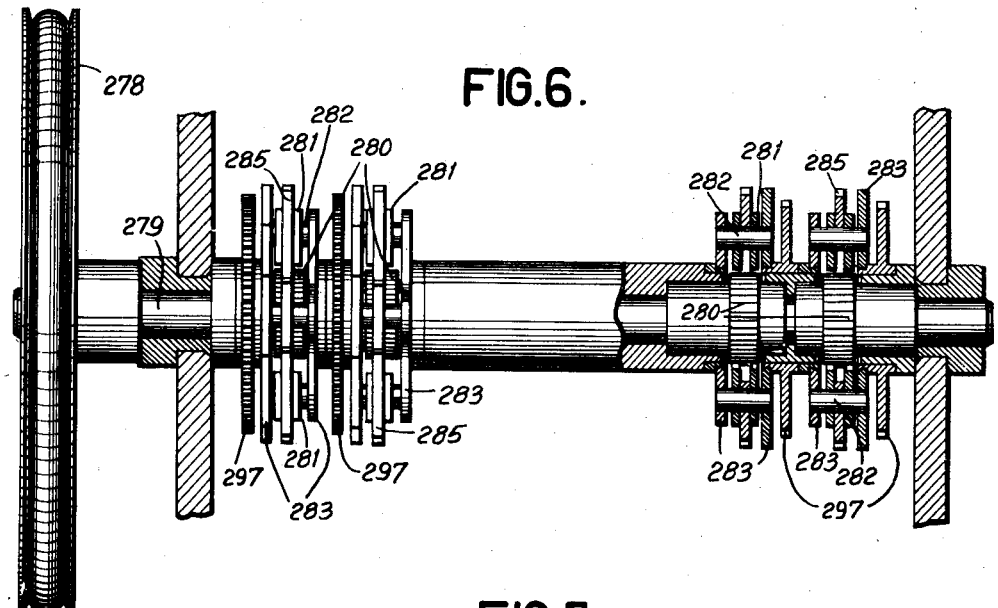
Fig. 6 is a view showing the relative location of the four storage unit clutches, the view being substantially along lines 6—6 of Fig. 3.

Through belt and pulley connection 278 (Fig. 3) a shaft 279 is driven. On this shaft 279 are four clutching devices (Fig. 6). Each of these clutching devices controls a separate section or unit of the storage mechanism so that each section may be independently operated and controlled, since for each section of the storage mechanism there is a separate adjustable contact mechanism. It will suffice to explain the operation of one of the sections, it being understood that the others are of the same construction and relation.

*Clutch mechanism.*—Referring to Figs. 4 and 6, the shaft 279 has secured thereto four clutch driving ratchets 280. In the plane of each driving ratchet there is a pair of pawls 281 pivoted on pins 282, which pins are mounted between a pair of disks 283, one of which disks has a series of lobes 284 about its periphery. The pawls 281 are bifurcated lengthwise where they surround the pin 282, and in the space provided by such bifurcation is disposed a ring 285 having ratchet teeth 286 and inward extensions 287 which latter abut the inner edges 288 of pawls 281. Normally, the parts occupy the position shown in Fig. 4 wherein a spring-pressed detenting finger 289 pivoted at 290 engages between a pair of adjacent lobes 284 to hold the disk 283 in position. A projection 291 of an arm 292 normally engages one of the teeth 286 so that the disk 283 and ring 285 are held in the relative displacement positions shown. It will be observed that springs 293 tend to rock the pawls 281 counterclockwise and through engagement of their edges 288 against extension 287 tend to urge the ring 285 in a clockwise direction, which is normally prevented by the extension 291.

When magnet 294 is energized, it rocks its armature latch 295 clockwise to release arm 292. The resulting clockwise rocking of arm 292 under the influence of its spring 296 will release ring 285 which may now rock slightly in a clockwise direction under the influence of the pawl springs 293, which at the same time rock the pawls 281 into engagement with the constantly running driving ratchet 280, thus coupling the disks 283 for rotation with the shaft 279 (see Fig. 5). The clutch disk 283 is integral with gear 297 (Fig. 6)

which meshes with a gear 298 (Fig. 4) loosely mounted on a shaft 299. Since there are four clutches such as described, there are four gears 297, and each drives a gear 298 on a shaft 299. As seen in Fig. 7, there are two of these shafts 299 which may be referred to as the upper and lower shafts, and the gears 298 are disposed on these shafts as shown with each gear controlling one of the four sections or units of the storage device as will be explaned later.

Figure 5:
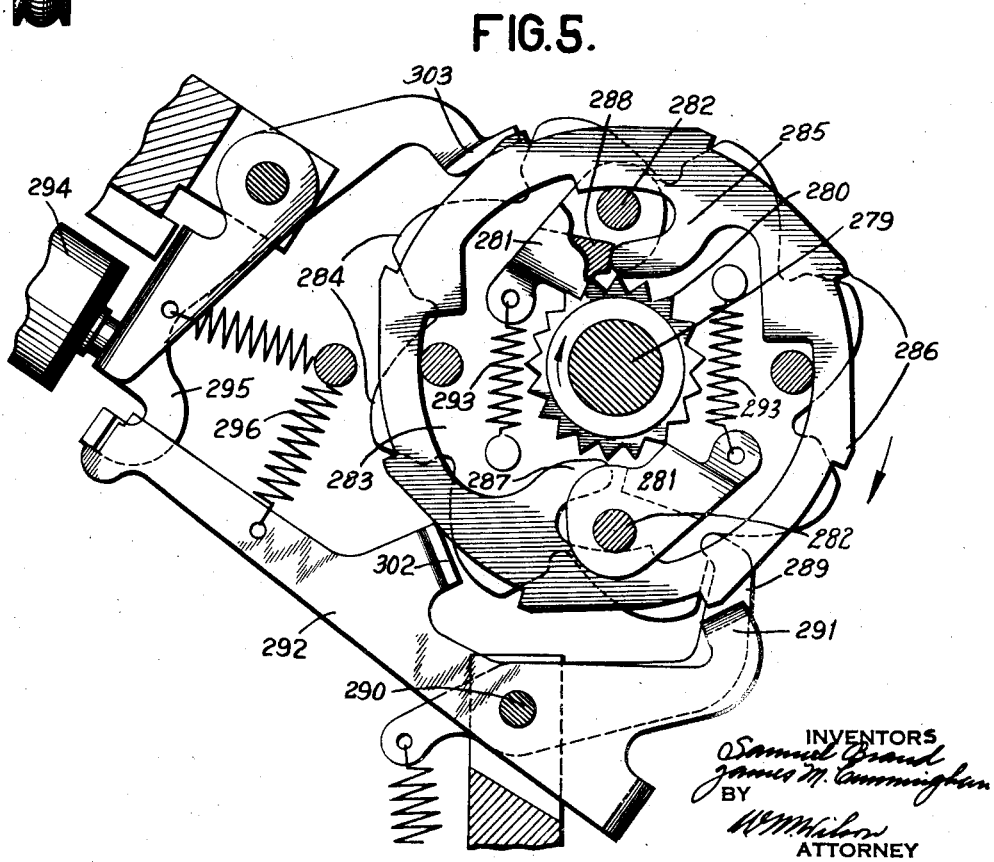
Fig. 5 is a further detail of the clutch in operating position.

Referring to Figs. 3 and 4, for each clutching mechanism there is provided a pair of contacts designated 301 which lie in the plane of rotation of the lobes 284 of disk 283. As the disk rotates, the lobe causes contacts 301 to open. In Fig. 5 is shown the position of the clutch parts with the magnet 294 energized and arm 292 tripped. It will be noted that as the parts rotate, one of the lobes 284 will engage a projection 302 of arm 292 and a little later another lobe will strike projection 303 of the armature latch 295, so that these parts will be restored after one step or one tooth of movement of the clutching mechanism. A single instantaneous energization of magnet 294, therefore, results in a single step of advance of the clutch and repeated energization will successively step the clutch ahead. If magnet 294 is held continuously energized, the clutch will remain engaged for continuous operation, with lobes 284 idly oscillating arm 292 and latch 295.

Figure 8:
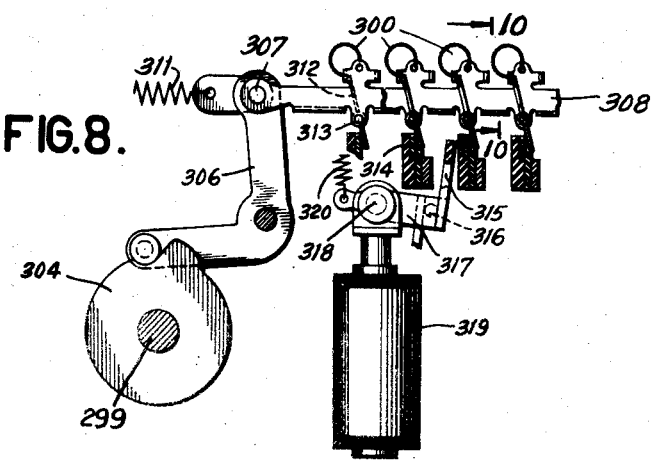
Figs. 8 and 9 are views showing the movable parts of the storage unit in different operating positions.
Figure 9:
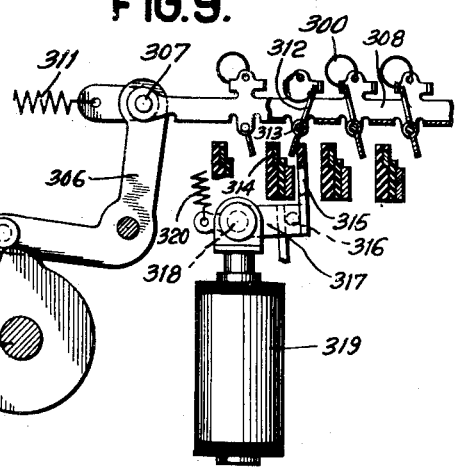
Figure 11:
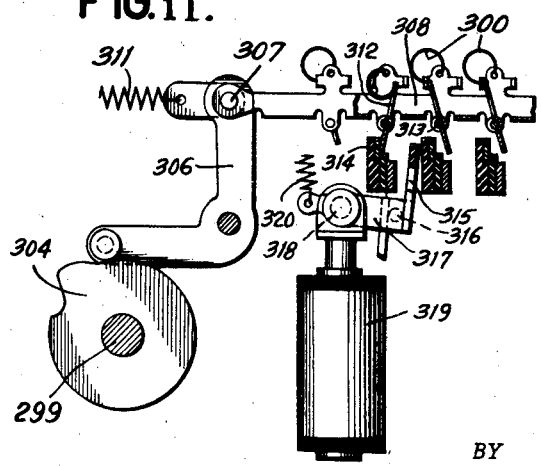
Fig. 11 is a further position view of the parts shown in Figs. 8 and 9.

*Storage contact mechanism.*—Referring to Fig. 7, each gear 298 drives a set of four cams 304 which are secured to one another and to the gear 298 through tie rods 305. The configuration of these cams is shown in Figs. 12, 2 and 4, and each controls a pair of bell crank follower arms 306. As cam 304 rotates, it will impart three positions to the bell crank 306 which may be termed a high, low or intermediate position. The pairs of arms 306 operating with a single cam 304 will be actuated by the dwell and rise in the cam at the interval indicated in Fig. 2 which is a little less than 180°, so that the two bell cranks are alternately operated, first the upper and then the lower. To each bell crank at 307 there is pivoted a channel 308 whose opposite end is pivoted at 309 to an arm 310, so that the channel is guided for substantially horizontal movement. A spring 311 serves to bias the channel and bell crank so that the roller of the bell crank bears against the cam 304. As cam 304 rotates, the channel 308 (Fig. 2) will take three different positions, i. e. the normal position shown, a position toward the left when the roller drops into the depression in the cam, and a position toward the right as the roller is engaged by the rise of the cam 304. In Figs. 8, 9 and 11 these three positions of the cam are illustrated.

Figure 10:
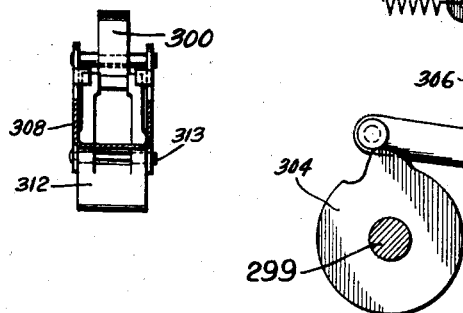
Fig. 10 is a detail of one of the settable arms, the view being taken along lines 10—10 of Fig. 8.

On each channel 308 there are pivoted ten contact blades 312 supported on pins 313 (see Fig. 10). The pins 313 are carried by the channel 308 and mounted so they do not rotate, while the blades 312 are rotatable on the pins, so that they may be rocked clockwise to the position shown in Fig. 9. When in either position, blade 312 is held there by a loop spring 300 connected between the upper end of the blade and the channel 308.

Extending transversely across the lower ends of the blades 312 are common contact bars 314 which are suitably mounted in insulating supports, so that as viewed in Fig. 3 there is a grid arrangement between the channels 308 and the bars 314 with the several channels extending in a horizontal direction, while the bars 314 extend beneath them in a transverse direction. If any blade 312 is rocked clockwise as in Fig. 11, its lower end will engage the related bar 314 and electrically connect the channel 308 with the bar. Channels 308 are insulated from one another and from the machine. The manner in which the blades 312 are given this clockwise rotation to contact the bar 314 will now be explained.

Extending across the blades 312 on the side opposite bar 314 is a plate 315 (Fig. 8) which is pivoted at 316. Each pivot 316 has at one extremity thereof an arm 317 which is articulated at 318 to the plunger of solenoid 319. A spring 320 normally holds the parts in the position shown. There are ten plates 315, five of which have their arms 317 on one side of the framework and the remainder have their arms on the opposite side. There are also five solenoids 319 on one side of the framework and five on the opposite side for conventience of arrangement (see Figs. 1 and 3). The ten solenoids, of which there are two sets, are associated one set with the upper part of the mechanism in Fig. 2 and the other associated with the lower part. The solenoids 319 in each set of ten are related to the ten digits.

Referring now to Fig. 8, when the cam wheel 304 is rotated counterclockwise, the roller of bell crank 306 first drops into the depression of the cam so that the channel 308 is drawn toward the left by its spring 311. In doing so, the blades 312 engage the bars 314 and are rocked counterclockwise so that all take the position shown in Fig. 8. This operation serves to restore any blades 312 which may have been rocked into their active position during some prior operation of the machine. Following this, the bell crank 306 is rocked clockwise by the high point of cam 304 to the position shown in Fig. 9. At this time if a solenoid 319 is energized, the plate 315 is rocked counterclockwise and will strike contact blade 312 to rock it to the position shown in Fig. 9. Thereafter, when the bell crank 306 rides down to the concentric portion of the cam, the channel 308 with blade 312 in its rocked position will move back to the position of Fig. 11 wherein the shifted blade 312 makes contact with the bar 314.

It may be pointed out at this time that the four cams 304 constituting a set controlled through a gear 298 are displaced ⅛ of a revolution with respect to one another, so that the four upper bell cranks 306 are rocked in succession from left to right (see Fig. 12) and thereafter the four lower bell cranks 306 are also rocked in succession. It may also be pointed out that a section or unit of the storage mechanism comprises eight channels 308 arranged in an upper and lower row of four channels each, so that through the four cams the eight channels are shifted in succession to be acted upon by the ten digit representing solenoids 319.

The plates 315 (Fig. 2) are mounted on the common pivot 316 so that energization of any solenoid 319 will rock both plates, but the only plate which will be effective on either an upper or lower channel is the one which is standing on the high lobe of the cam 304 at the time the solenoid is energized. Each set of cams 304 is provided with a roller 320 which cooperates with pairs of similar contacts 321, 322, and 321a, 322a, the roller being so positioned that when any set of four cams has commenced a revolution, the related contacts 321 and 321a will be permitted to close and contacts 322 and 322a permitted to open.

Connected to each of the four gears 298 for driving engagement is a commutator brush structure shown in Figs. 1 and 7, wherein a double brush 323 traverses the common conducting ring 324 and nine separate conducting segments 325. The segments are spaced to correspond to the nine stepping positions of the related cams 304 with a segment 325 for each of the positions to which the device is stepped. These emitters are illustrated diagrammatically in the circuit diagram (Fig. 14a). In the circuit diagram of the parent application Serial No. 433,178 (now Patent 2,375,275) the contact blades 312 and common bars 314 are represented in a diagrammatic manner to represent a grid structure and the manner in which such grid structure controls calculating operation of the machine is specifically set forth.

Briefly reviewing the positioning of slides 308, it is noted that there are eight slides and that cams 304 make nine steps during a complete revolution. For each step of cams 304, except for the last or ninth step, a slide 308 is moved from the position of Fig. 11 or Fig. 2 to the position of Fig. 8 and then to the position of Fig. 9. While slides 308 are in the position of Fig. 9, their contact elements 312 are set by bails 315.

In the complete machine the record card is automatically advanced step by step to present the card columns to the row of brushes 121 (Fig. 14a) one at a time. For purposes of simplification in the present case, it will be assumed that the columns are manually presented in succession, beginning with column 1 of the card of Fig. 13. It will be further assumed that contacts 29 (Fig. 14a) are first closed momentarily before the first column is presented and that, while each column is at the brushes and shortly after its presentation thereto, a relay R52 is energized (or alternatively, its contacts R52a are closed momentarily, that is, closed and opened again before the next succeeding column is presented to the sensing brushes).

*Circuit diagram*

In the circuit diagram (Figs. 14a and 14b), there is shown only so much of the circuit connections as will serve to explain how the data on the card of Fig. 13 is entered into the storage devices. The record card (Fig. 13) has four fields in which amounts 1234, 5678, 9012 and 070157 are punched respectively, as shown. These amounts are to be read in succession and each amount is to be entered into a different one of the four storage units, digit by digit. The reading devices comprise a row of sensing brushes 121 which make contact through the card perforations with a common conductor 117. For purposes of the present explanation, it will be assumed that at the outset the first column of the card of Fig. 13 is being sensed by brushes 121 and the card is thereafter advanced step by step or column by column to present the subsequent card columns to the brushes.

Current is directed to main lines 330 and 331. As a preliminary, through mechanism not specifically shown a pair of contacts 29 known as latch contacts are closed, while the card is advanced to its first column sensing position, and such closure will complete a circuit from line 330 (Fig. 14a), contacts 29, relay MR1 to line 331. Suffice it to say herein that these contacts 29 are closed while a card is advanced from the usual hopper to the card sensing brushes 121, and that this period of time is constant and of such duration that the contacts 29 are closed and in turn relay MR1 is energized for a period adequate to accomplish the several functions controlled by the contacts of the relay as will be pointed out. Magnet MR1 closes its contacts MR1a which complete a circuit from line 330, contacts MR1a, two magnets 342 in parallel, to line 331. The magnets 342 are the reset magnets of a well known form of stepping relay switch. Their energization at this time serves to insure starting of the stepping switches from home position. These stepping switches are diagrammatically shown in Fig. 14b where their stepping magnets are designated as SR1 and SR2. Energization of magnets SR1 and SR2 will directly step the contact arms upon energization of the magnets against spring action, and the arms will be held in advanced position by the usual holding pawls which are released for restoration through magnets 342.

*Restoration of storage units.*—When relay magnet MR1 is energized, a circuit is completed from line 330 (Fig. 14a), wire 347, the four lower contacts MR1d now closed due to energization of MR1, cam shaft contacts 321 of the storage units which are closed if the units are not in their home position (see also Fig. 2), thence through clutch magnets 294 to line 331. This circuit will keep the clutch magnets 294 continuously energized until their respective clutch assemblies have turned to a position just before arriving in home position, at which time the contacts 321 are opened to break the clutch magnet circuit but the cams nevertheless continue to their home position. If at the time relay magnet MR1 is energized a storage unit is already in home position, the above circuit will, of course, not be completed since the related contacts 321 will be in open position.

Magnet MR1 has also closed a pair of contacts MR1e to complete a circuit traceable from line 330 (Fig. 14a), wire 347, contacts MR1e, relay magnet R12 to line 331. Magnet R12 closes its contacts R12a to provide a holding circuit traceable from line 331, magnet R12, contacts R12a, wire 351, thence through the commutator devices of the four storage units in series, through a circuit established when all the brushes 323 are standing in home position as shown, thence to line 330. Movement of any brush 323 out of home position will break this holding circuit.

*Initial advance of storage unit #1.*—When latch contacts 29 open and deenergize magnet MR1, its contacts MR1f (Fig.14b) will close and with magnet R12 energized upon restoration of all storage units as explained, a circuit is traceable from line 330, contacts MR1f, R12b to plug socket designated q2, thence through a plug connection 352, plug socket r2, relay magnet R32, wire 353, to line 331. Magnet R32 will thus be energized and will remain so through the following holding circuit: from line 330, contacts MR1c now closed, wire 349, contacts 322a of the storage unit, contacts R32b now closed, holding coil of magnet R32 to line 331. The uppermost contacts 322a are related to storage unit #1 and this holding circuit will be maintained until this storage unit has moved out of its home position, when contacts 322a will open. Energization of magnet R32 causes closure of a pair of contacts R32a and a circuit is completed from line 330, contacts R32a now closed, left hand contacts R25c, wire 354 enclosed in a cable 355 (Fig. 14a) to contacts 322 of the first storage unit, and thence through the #1 magnet 294 to line 331. Thus, the magnet 294 of the first storage unit is energized and this unit will move from its home position to #1 position (see Fig. 9), and during such movement the cam shaft contacts will shift to cause closure of contacts 321 and opening of contacts 322 for this unit, and relay magnet R32 will be deenergized as explained. The time required for operation of the card feeding mechanism and related devices is such that the storage unit is restored and its first columnar position set up as in Fig. 9 before the digit magnet 319 is energized in response to the sensing of a perforation. In other words, the first card column is not presented to the sensing brushes until relay MRI has first been energized and deenergized and relay R32 thereafter energized and deenergized.

*Entering into first column of storage unit #1.*—The following circuit is completed to set up the digit 1 as punched in the card in the first column of the storage unit #1. This circuit is traceable as follows: from line 330 (Fig. 14a), several interlocking contacts (not shown), wire 356, card reading roller 117, #1 brush 121 now in contact with the 1 position in the first column of the card of Fig. 13, thence through related wire 357, the pair of digit solenoid magnets 319 related to the digit 1 and thence to line 331. Since the #1 storage unit has already been operated to place its #1 column in setup position (see Fig. 9), this operation of the #1 digit bail 315 will set up the digit 1 in the first column of the storage unit.

*Advance of storage unit #1 from column 1 to column #2.*—At the same time that the circuit just traced is completed, a further circuit (not shown) is closed to cause the clutch magnet 294 of storage unit #1 to be energized. This circuit causes momentary closure of contacts R52a (Fig. 14a) to complete a circuit from line 330, wire 358, contacts R52a, contacts R25a now closed, upper contacts MR1d, cam shaft contacts 321 of storage unit #1 which are now closed, the clutch magnet 294 and line 331. The circuit for energizing relay R52 (not shown) includes a number of interlocking contacts. For present purposes and for the sake of simplicity, it may be assumed that relay R52 is momentarily energized after each card column is sensed by brushes 121, and that the relay is deenergized before the next card column is sensed. It may alternatively be assumed that contacts R52a are manually closed momentarily between the sensing of successive card columns.

*Advance of the card from column 1 to column 2.*—While this takes place, other devices function to space the card one column to bring the second column of the field under the sensing brushes 121 or alternatively, as stated, the card may be manually shifted to present the next column to the sensing brushes.

*Entering from column #2 of the card.*—With the second column of the card in sensing position and with the second column of the storage unit #1 in entry receiving position, the circuits similar to those already traced will be completed to energize the solenoid bail magnet 319 (Fig. 14a) related to the digit 2, and the momentary energization of relay magnet R52 will again trip the clutch magnet 294 of the storage unit to advance it to the next column. These circuits repeat for the third and fourth columns of the card so that, after the fourth column has been sensed, the amount 1234 of the card of Fig. 13 is set up in the first four columns of the storage unit #1.

*Shift to control storage unit #2.*—As a preliminary to the operation of the machine, it is determined how many orders in each storage unit are to be used, and this is generally in accordance with the columnar capacity of related card fields. Thus, since the first card field (Fig. 13) is of four column capacity and the data therein is to go into unit 1, the brush socket d8 (Fig. 14a) wired to the fourth segment 325 of the emitter of unit 1 is connected by a plug connection 363 to the 1 socket of a stepping switch SR1 (Fig. 14b). Likewise, since the second and third card fields are also of four column capacity, their fourth emitter sockets d9 and d10 are connected to the second and third sockets b7 and c7 through connections 371 and 374 respectively. The fourth card field is of six column capacity, so it is the sixth socket f11 of the related emitter that is connected in this case through connection 377 to socket d7 of the stepping relay SR1. Thus, the number of columns in each card field determines from which emitter socket a connection is to be made. These connections serve to interrupt further entries into a storage unit when all the columns of the related card field have been sensed and to prepare the next storage unit to receive data from its related card field. During the sensing of the fourth column of the card, additional circuits are brought into operation to prepare the second storage unit in the machine to receive the amount from the second field of the card (Fig. 13). The circuit involved is traceable as follows: from line 330 (Fig. 14a), wire 358, contacts R52a, closed momentarily during the sensing of the card column, wire 362, to the common 324 of the storage unit emitters of which the emitter for unit #1 now has its brush 323 in the "4" position, and the circuit continues through emitter segment 325 in the fourth position to the fourth plug socket designated d8, thence through plug connection 363 (Fig. 14b), plug socket a7 to the segment wiper and common of the stepping relay controlled by the magnet designated SR1, thence through the wire 364 to another common of the stepping relays controlled by magnet SR1, wiper and segment to plug socket k1, plug connection 365, socket s2, relay magnet R33 to line 331. Briefly, when the fourth order of storage unit 1 is in entry receiving position, relay R33 becomes energized. Obviously, if the card field related to storage unit 1 were of, say, eight column capacity, in which case plug connection 363 would have been made to the eighth socket h8, relay R33 would not be energized until such eight column were reached. Energization of magnet R33 will cause storage unit #2 to be brought into its #1 position as in Fig. 9, providing magnet R27 is deenergized, which will be the case at this time. The circuit involved is traceable from line 330 (Fig. 14b), contacts R33a, left hand contacts R27c, wire in cable 355 (Fig. 14a), contacts 322 of storage unit #2, the 2 magnet 294 to line 331. At the same time a circuit is completed to energize magnet R25 so that its contacts R25a are open and no further circuit is completed to the magnet 294 of the first storage unit through these contacts. This circuit is completed from line 330, through wire 358, contacts R52a closed, wire 362, emitter of unit #1, the fourth plug socket

*d8*, the connection 363 to the plug socket *a7* (Fig. 14*b*) as already traced, wire 364 to the stepping relay controlled by the magnet designated SR1, to a plug socket in the first position designated *a1*, plug connection 366 to plug socket *a2*, relay magnet R25 and thence through wire 353 to line 331. Magnet R25 opens its contacts R25*a*.

Magnet R25 also closes a pair of contacts R25*d* and will provide a holding circuit to maintain this magnet energized until the #1 storage unit has been restored to its home position. This holding circuit is traceable from line 330, contacts MR1*c*, wire 349, uppermost contacts 321*a* now closed, R25*d*, holding coil of magnet R25 to line 331. This magnet thus remains energized until the storage unit #1 is in its home position when contacts 321*a* open. It may be mentioned at this point that there is a parallel holding circuit traceable from contacts MR1*c*, wire 349, contacts R20*c*, R25*d*, magnet R25 to line 331, which will be holding the magnet energized until magnet R20 is energized. Magnet R20 is energized when the function that is performed under control of the entry in storage unit #1 is completed and is plug connected to operate after that function has been performed. For the present problem, however, magnet R20 is not utilized so that its contacts R20*c* remain closed throughout operations and magnet R25 accordingly remains energized until magnet MR1 is energized during the feeding of the next succeeding card.

The magnet R25 also closes contacts R25*b* (Fig. 14*b*) completing a circuit from line 330, contacts MR1*c*, wire 349, contacts R25*b*, cable 367 (Fig. 14*a*), uppermost contacts MR1*d*, contacts 321, the #1 clutch magnet 294, line 331. The continued energization of magnet 294 will step the storage unit #1 around to its home position wherein contacts 321 open and wiper 323 of unit #1 is returned to the position of Fig. 14*b*, leaving the unit in such home position (see Fig. 2). The circuit for causing the stepping relays SR1 and SR2 to advance one position when the fourth column of the card is sensed is traceable as follows: from line 330 (Fig. 14*a*), wire 358, contacts R52*a*, wire 362, to the emitter of storage unit #1, the socket *d8* associated with the fourth position, plug connection 363, plug socket *a7* (Fig. 14*b*), stepping relay controlled by magnet SR1, the wipers of this relay to the common segment, wire 364, contacts 369 associated with the relay controlled by magnet SR1, thence through the stepping relay magnets SR1 and SR2, in parallel to line 331.

Energization of magnet SR1 attracts its armature and causes closure of contacts 370 and then opens contacts 369. This transfers the circuit to the contacts 370 before the contacting arm and stepping relays actually shift. Relay contacts R52*a* and 370 thus hold magnets SR1 and SR2 energized after the initial circuit is broken, due to shifting of the relay wipers.

Recapitulating, the fourth column of the card is presented to the brushes 121 and a circuit is completed therethrough to energize the 4 solenoids 319 to set up a 4 in storage unit #1. After this is done and while the fourth card column is still in sensing position, relay R52 is energized (assumed to be manual for present purposes) to complete the circuits traced, to energize relays R33 and R25 and the stepping switch magnets SR1 and SR2. Relays R33 and R25 will immediately set up holding circuits as traced, so that as magnet SR1 operates to close contacts 370 and advance the switch arms upon energization of the magnet, contacts 370 are closed before the switch arms are fully stepped. This transfers the circuit of magnet SR1 to relay contacts R52*a* through wire 362 to insure sufficient duration of current to the magnet for full advance of the switch arms, and by opening contacts 369 after closure of contacts 370 the initial circuit to magnet SR1 is broken.

Meanwhile, storage unit #1 advances to home position under control of contacts R25*b* and storage unit #2 advances one step to its #1 position ready to receive an entry. When contacts R52*a* (Fig. 14*a*) are now opened, the stepping switch arms are in their 2 positions so that de-energization of magnet SR1 will permit reclosure of contacts 369 (now disconnected from any live circuits) and reopening of contacts 370. The card is now advanced to present the left hand or first digit of the second amount to the sensing brushes 121 and the apparatus is ready to receive such second amount.

Reading the second amount

The circuits to set up storage unit #2 in accordance with the perforations of the second field in the card are exactly the same as for storage unit #1, that is, for the example chosen the digit bail magnets 319 (Fig. 14*a*) corresponding to perforation in a 5 position of the card column will be energized and at the same time a circuit is completed through the clutch magnet 294 of the storage unit #2, this latter circuit being traceable from line 330, wire 358, contacts R52*a*, contacts R27*a*, upper contacts MR1*d*, contacts 321 now closed, #2 magnet 294 to line 331. As a result, the digit 5 is entered in the first order of the second storage unit. Concurrently, the card is spaced, bringing the sixth column into sensing position wherein operations are repeated to enter a 6 in the second column followed by the entering of a 7 in the third column, and an 8 in the fourth column.

Meanwhile, the emitter of storage unit #2 is stepped around and, when it reaches the fourth position, a circuit is completed to disconnect the #2 unit clutch magnet operating circuit by opening contacts R27*a*. The circuit through the fourth segment of the emitter unit of the unit #2 is traceable as follows: from line 330, wire 358, contacts R52*a* when they close, wire 362, emitter brush 323 of unit #2 to the fourth plug socket *d9*, plug connection 371 to socket *b7*, segment and common of uppermost emitter SR1, wire 364 to left hand of the lower stepping relays SR1, to socket *b1*, plug connection 372, the plug socket *b2*, relay magnet R27, wire 353 to line 331. A parallel circuit extends from wire 364, through the right hand stepping relay SR1 to socket M1, plug connection 373, plug socket *t2*, relay magnet R34, wire 353 to line 331. Thus, relay magnets R27 and R34 are accordingly energized when storage unit #2 is in its fourth column entry receiving position and when contacts R52*a* close. A further parallel circuit extends from wire 364, through contacts 369, stepping relay magnets SR1 and SR2 to line 331. This has the effect, as before, of advancing stepping relays SR1 and SR2 together to their third position.

The card is advanced to present its ninth column to the sensing brushes 121, and the storage unit #3 is prepared to receive entries under control of the third field of the card (Fig. 13). This preparation is the same as that for storage unit #2 in that magnet 294 of unit #3 receives an impulse to bring its first column into receiving position through a circuit traceable from line 330, contacts R34a now closed, R29c, cable 355, contacts 322 of unit #3 to #3 magnet 294, and thence to line 331.

This results in the opening of contacts 322 and closing of contacts 321 so that subsequent energization of magnet 294 of unit #3 is through the circuit from line 330, wire 358, contacts R52a, contacts R29a, upper contacts MR1d, contacts 321, #3 magnet 294 to line 331. This energization takes place, of course, each time a column of the card is sensed.

It may be pointed out that in connection with storage unit #2 this unit is also advanced to its home position in a similar manner to that in which unit #1 was previously returned to home position. This is effected by holding magnet 294 continuously energized through a circuit traceable from line 330, contacts MR1c, wire 349, contacts R27b, cable 367, upper contacts MR1d (second from the top), contacts 321 of unit #2, the 2 magnet 294 to line 331. When this unit reaches home position, shifting of contacts 321 and 322 breaks the circuit.

*Reading the third amount*

Sensing of the 10th, 11th and 12th columns of the card and setting of the amount 9012 in unit #3 takes place in the now familiar manner and, when this unit is stepped to its fourth column position, inasmuch as this is a 4 column field, as the number is sensed the following circuit is completed: from line 330, wire 358, contacts R52a, wire 362, brush 323 of unit #3 in the fourth position, to the plug socket d10, plug connection 374 to plug socket c7, thence through wire 364 to the two lower commutators of stepping relay SR1 and thence in parallel to plug sockets c1 and n1, plug connections 375 and 376, respectively, to plug sockets c2 and u2 to energize relay magnets R29 and R35 in parallel, the circuit being completed through wire 353 to line 331.

As before, the stepping magnets SR1 and SR2 are energized along with the relay magnets R29 and R35. Energization of magnet R35 causes its contacts R35a to complete the now familiar circuit through cable 355 and contacts 322 of unit #4 to energize the related magnet 294 and advance it the one step into position to receive the entry from column 13 of the card (Fig. 13). At the same time closure of contacts R29b also completes a circuit parallel to those already traced for the storage units #1 and #2 through cable 367, and upper contacts MR1d, contacts 321 of unit #3 to continuously energize magnet 294 of storage unit #3 until the latter has advanced to its home position. Contacts R29a incidently open to prevent any impulses being routed to the other storage unit clutch magnets from this source.

*Reading the fourth amount*

The data from the fourth field of the card (columns 13 to 18) now is entered column by column into storage unit #4 in the now familiar manner. Since this is a 6 column field, entry progresses until the brush 323 of unit #4 has advanced to the 6th position. In such position a circuit is traceable from line 330, wire 358, contacts R52a, wire 362, brush 323 of unit #4 to the sixth plug socket f11, plug connection 377, plug socket d7, stepping relay segments of relay SR1, wire 364, left hand section of stepping relay SR1, plug socket d1, plug connection 378, plug socket d2, relay magnet R31, wire 353, to line 331. A parallel circuit is traceable from wire 364, lower section of stepping relay SR2, its plug socket d4, plug connection 379 to plug socket e5, relay magnet R39, wire 353 to line 331. At the same time, of course, the magnets SR1 and SR2 are also energized so that both stepping relays advance another step to bring their wipers in contact with the segments in their fifth positions.

Relay magnet R31 closes its contacts R31b to complete the circuit through cable 367 (Fig. 41d) so that magnet 294 of storage unit #4 will be continuously energized as already explained to advance this unit to its home position, so that at this point in the operation of the machine all four storage units are in their home positions with each containing a setting representing the amounts perforated in the four fields of the record card (Fig. 13).

Relay R39 serves to initiate operations of reading out the values entered in the storage devices and its energization is a signal that entries from the card have been completed. Since the reading out operations are not part of the present invention, the same are not shown or described herein.

Another card may now be sensed and its data entered into the storage devices as before. If this card has the same number of columns allocated to each field, the connections 363, 371, 374 and 377 will remain the same. If, however, for example, the first field contained only two columns of digits, connection 363 would be made to the 2 socket of the commutator of unit 1 (Fig. 14a) so that, following the sensing of the second card column, unit #2 is stepped to its first entry receiving position. Unit #1 will, however, contain entry in its third and fourth positions from the previous card and it is for this reason that unit #1 (and other units) are stepped to home position upon completion of entries therein, for in doing so any previous settings in higher orders than used for the current card will be reset and the unit will contain only desired data.

The initial resetting of all units at the commencement of operations is a precautionary measure to insure that no settings have remained in the units from some prior operation as where in such prior operation entries were made in four units and only three are now to receive new entries. In such case there would be four entries to be read out after the card has been sensed when only three are desired.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, an entry receiving device comprising a series of conductive slides arranged in parallel and mounted for reciprocation, a series of contact elements, one series for each slide, each series including an element for each of the digits of a notation, carried by and in electrical contact with the related slide, each element being movable to two alternate positions, the elements of the several slides related to the same digit lying in a common plane, a series of contact bars, one for each of the digits, each bar extending along a line adjacent to the related plane of elements transversely to the slides, any contact element upon being moved from its first to its second alternate position contacting the related contact bar to effect an electrical connection between a bar and a slide, a series of actuators, one for each set of like digital contact elements, said elements being normally unresponsive to the operation of the actuators, means for reciprocating the slides seriatim through the entire series of slides, means for operating said actuators, said series of contact elements being responsive to the operation of the actuators only during the reciprocation of the related slides.

2. In a machine of the class described, a device for receiving a digital entry comprising a slide, a clutch drive mechanism for effecting operation of said slide in a manner so as to move it from a rest position, through a reset position, through to an entry receiving position and back to rest position, a series of contact elements pivoted to the slide, each having a set and an unset position, means for selectively rocking any one of the elements from unset to set position when the slide is in its entry receiving position, and means effective as the slide passes through its reset position and before it reaches its entry receiving position for causing rocking of any said elements to its unset position.

3. In a machine of the class described, a slide movable from a rest position to a reset position, then to an entry receiving position and then back to its rest position, a contact element supported on the slide movable to a set or unset position, detenting means to hold the element in either position, means for moving the slide from its rest to its reset and receiving positions and back to rest position in succession, means effective when the slide moves to its reset position for adjusting the element to its unset position if it is not already there, and means selectively effective when the slide is in its subsequent receiving position for adjusting the element to its set position, said detenting means holding the element in set position as the slide moves back to its rest position.

4. The invention set forth in claim 3 in which the means for moving the slide comprises a cam mechanism, and the means effective to move the element to its unset position comprises a fixed member positioned in the path of movement of the element, to stop the element while the slide continues to move, the resultant relative movement of slide and element causing adjustment of the element to its unset position.

5. In a machine of the class described, a series of slides, each having a plurality of settable elements thereon positionable to represent data entries on the slides, means for moving the slides in succession, each to an entry receiving position and back again, means for sensing a record card, column by column, for data representations therein, entering means for the slides operative to position the elements thereon, means coordinated with said sensing means for causing said moving means to move the slides in succession and beginning with the first slide in the series as successive card columns are sensed, said entering means being controlled by the sensing means to position the elements on the slides when in their entry receiving positions to represent on each slide the data sensed in the successive card column, and means operative when entries have been made in a predetermined number of slides for preventing further entries.

6. The invention set forth in claim 5 in which the entering means is common to all the slides and the means for moving the slides in succession comprises an intermittent drive mechanism operative to bring the slides into cooperative relationship with the entering means one by one.

7. In a machine of the class described, a series of slides, a plurality of contact elements on each, separately settable in a reset or entry representing position, a stationary structure adjacent to said elements, each slide being individually movable so that any element thereon will be adjusted from its entry representing position to reset position by engagement with the stationary structure during the individual movement of the slide, and means for moving the slides, one by one, in successive order to effect resetting of the elements slide by slide.

8. In a machine of the class described, a series of parallel slides, a plurality of pivoted arms on each slide, one for each of the digits of a notation, the arms related to the same digit on the several slides forming a line transverse to the length of the slides, a plurality of bails extending transversely to the slides, one bail for each line of arms, said arms being normally out of the path of movement of the bails, means for selectively rocking the bails, an intermittently operating drive, means for moving the slides in succession to clear said arms and to bring them into the path of movement of the bails whereby the selected bail will rock the related arm, means effective during said movement of a slide and prior to its arrival in the path of movement of the bails for causing restoration of any previously rocked arm, and means for retaining the rocked arm in position.

9. In a machine of the class described, a pair of entry receiving devices, each comprising a plurality of orders of entry receiving elements, entering means comprising a single set of magnets having a single set of armatures for directly operating all the orders of both devices, record controlled means for energizing the set of magnets in response to the sensing of data designations on a record card, means for rendering one of the entry receiving devices responsive to the operation of said set of magnets, said last named means causing the elements of the said one device to be responsive to the operation of the magnets in successive order, and means controlled by the said one device when entries have been made in a predetermined number of elements thereof for rendering the second entry receiving device responsive to the operation of said set of magnets.

SAMUEL BRAND.
JAMES M. CUNNINGHAM.